United States Patent [19]

Jacobs

[11] Patent Number: 4,872,928

[45] Date of Patent: Oct. 10, 1989

[54] SOLDER PASTE

[75] Inventor: Wayne Jacobs, San Diego, Calif.

[73] Assignee: Johnson Matthey Inc., Valley Forge, Pa.

[21] Appl. No.: 210,045

[22] Filed: Jun. 7, 1988

[51] Int. Cl.$^4$ ............................................. B23K 35/34
[52] U.S. Cl. ......................................... 148/24; 148/25
[58] Field of Search ................................... 148/24, 25

[56] References Cited

U.S. PATENT DOCUMENTS

| | | | |
|---|---|---|---|
| 2,867,037 | 1/1959 | Lawton | 148/24 |
| 3,065,538 | 11/1962 | Melchiors | 148/24 |
| 3,597,285 | 8/1971 | Aronberg | 148/25 |
| 3,734,791 | 5/1973 | Poliak | 148/25 |
| 4,495,007 | 1/1985 | Zado | 148/24 |
| 4,557,767 | 12/1985 | Hwang | 148/24 |
| 4,701,224 | 10/1987 | Zado | 148/24 |

Primary Examiner—Peter D. Rosenberg
Attorney, Agent, or Firm—Cushman, Darby & Cushman

[57] ABSTRACT

A water-soluble solder paste consisting essentially of solder powder, water-soluble organic activator and polyethylene glycol vehicle.

7 Claims, No Drawings

SOLDER PASTE

The present invention relates to solder pastes and, more particularly, to a water-soluble solder paste.

In preparing electronic circuits, it is conventional to solder the circuit elements to support members using various types of soldering alloys, e.g., tin-lead (Sn/Pb) alloys. A wide variety of such solders are available for use in paste form. When an electronic circuit is made using conventionally available solder pastes, it is necessary to clean the circuit to remove excess paste using either an organic solvent such as freon or water with detergent (about 8-10% by weight) added to it.

The purpose of the present invention is to provide a solder paste for use in making electronic circuitry which is water-soluble in the sense that the paste components, other than the soldering alloy itself, are water-soluble. This greatly facilitates the use of the paste and subsequent clean up.

Broadly defined, the paste of the invention consists essentially of solder powder, water-soluble organic activator and water-soluble organic vehicle, notably polyethylene glycol and preferably a mixture of such glycols.

The invention contemplates the use of any conventionally employed solder powder, e.g., 60 Sn, 40 Pb alloy powder or the equivalent. The amount of this component can be varied but generally will comprise more than 70% by weight of the paste, preferably 85-95% thereof.

The activator component is used to facilitate cleaning of surfaces which are to be joined by soldering. This component also functions to activate the surface of the solder powder by cleaning its surface, by reacting with surface oxide or by otherwise improving the bonding function of the fused powder to the circuit elements to be bonded. Particularly useful activators include, for example, acids such as citric acid; triethanolamine or equivalent lower alkanol amines, and alkylamine acid salts typified by 2-ethylhexyl amine hydrobromide, or mixtures of these. A preferred embodiment includes the use of a mixture of citric acid, triethanolamine and 2-ethylhexyl amine hydrobromide.

Normally, the activator will comprise from 0.5 to 10% by weight of the paste.

The organic vehicle is a particularly important feature of the paste. This should include at least one polyethylene glycol and preferably comprises a mixture of polyethylene glycols such as Carbowax 200, 600 and 3350.

Without intending to be limited thereto, the following are examples of preferred paste formulations according to the invention, component percentages being chosen to give 100% by weight.

| Component | % by weight |
| --- | --- |
| 60/40 Sn/Pb alloy powder | 85-90% |
| Activator | |
| 2-ethylhexyl amine hydrobromide | 1-3% |
| triethanolamine | 1-3% |
| citric acid | 0.5-3% |
| Organic Vehicle | |
| polyethylene glycol 200 (Carbowax 200) | 1-5% |
| polyethylene glycol 600 (Carbowax 600) | 1-3% |
| polyethylene glycol 3350 (Carbowax 3350) | 1-5% |

Specific examples of formulations as illustrated above include the following:

EXAMPLE 1

| | |
| --- | --- |
| 60/40 Sn/Pb solder powder | 90% |
| 2-ethylhexyl amine hydrobromide | 1% |
| triethanolamine | 1% |
| citric acid | 3% |
| polyethylene glycol 200 | 1% |
| polyethylene glycol 600 | 3% |
| polyethylene glycol 3350 | 1%/100% |

EXAMPLE 2

The same formulation as in Example 1 except that the citric acid content is 1% and the triethanolamine or 2-ethylhexyl amine hydrobromide is 3%.

EXAMPLE 3

The same formulation as in Example 1 except that the content of polyethylene glycol 200 or 3350 is increased to 3% and the content of polyethylene glycol 600 is reduced to 1%.

EXAMPLE 4

| | |
| --- | --- |
| 80/40 Sn/Pb solder powder −200 + 325 mesh particles | 88.30 |
| PEG 200 (Carbowax 200) | 5.50 |
| PEG 600 (Carbowax 600) | 2.20 |
| PEG 3350 (Carbowax 3350) | 1.65 |
| Citric acid | 1.65 |
| Triethanolamine | 0.70 |
| | 100.00 |

The solder powder used in the above examples is comprised of −200+325 mesh particles. It will be recognized, however, that other particle sizes may be used.

The solder pastes referred to above can be used in conventional fashion to prepare electronic circuits by soldering electronic elements to support surfaces or the like. The advantage of the present pastes is that the completed circuit board or equivalent can be readily cleaned by simply washing with water alone.

The pastes exemplified above may be used as follows:

The solder paste is screen printed onto an electronic circuit board in the appropriate pattern using a stainless steel screen or metal stencil and normal screen printing techniques. The electronic circuit components such as capacitors or diodes are placed in the thus printed solder paste using either manual or automatic pick and place methods. The electronic circuit boards are then placed on a belt and transported through a heated furnace such as an infrared belt furnace which is adjusted to give an appropriate temperature profile. This melts the solder so as to attach the components to the electronic circuit boards. The electronic circuit boards are then transported through a spray cleaning unit charged with hot (e.g., 150°-200° F.) water only to remove residual solder paste.

It will be recognized that various modifications may be made in the invention as described above without departing from the spirit and scope thereof. Thus, for example, other types of tin-based solder alloys, e.g., tin/bismuth or tin/silver alloys may be used in lieu of the tin/lead alloy which has been exemplified. Additionally, it will be recognized that use of the solder pastes of the invention is not limited to the preparation of electronic circuits. These pastes may be effectively used wherever solder can be used, e.g., for soldering connections in the home or the like. Accordingly, the scope of the invention is defined in the following claims wherein:

I claim:

1. A water-soluble solder paste consisting essentially of at least 70% by weight solder powder, 0.5 to 10% by weight water-soluble organic activator selected from the group consisting of alkylamine acid salt, lower alkanolamine and acid, the balance being essentially a mixture of polyethylene glycols.

2. A paste according to claim 1 wherein the paste is Sn/Pb alloy powder, the activator is selected from the group consisting of alkylamine acid salt, lower alkanolamine and acid and the mixture of polyethylene glycols is selected from the group consisting of polyethylene glycol 200, 600 and 3350.

3. A paste according to claim 2 wherein the activator is a mixture of 2-ethylhexyl amine hydrobromide, triethanolamine and citric acid; and the vehicle is a mixture of polyethylene glycol 200, 600 and 3350.

4. A paste according to claim 3 containing, by weight, 85–90% solder powder; 1–3% of the hydrobromide; 1–3% of the triethanolamine; 0.5–3% of the citric acid; 1–5% of the polyethylene glycol 200; 1–3% of the polyethylene glycol 600 and 1–5% of the polyethylene glycol 3350.

5. An electronic circuit comprising circuit elements soldered to a support member, the elements being soldered to the support member by the paste of claim 4.

6. In a method of making an electronic circuit wherein circuit elements are soldered to a support member using a soldering paste, the improvement which comprises using the paste of claim 4 as the soldering paste.

7. The method of claim 6 wherein, after soldering, the circuit is washed with water only to remove excess solder paste.

* * * * *